(12) United States Patent
Yu

(10) Patent No.: US 11,089,511 B2
(45) Date of Patent: Aug. 10, 2021

(54) SYSTEMS, METHODS AND DEVICES FOR USER PLANE TRAFFIC FORWARDING

(71) Applicant: APPLE INC., Cupertino, CA (US)

(72) Inventor: Yifan Yu, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/479,432

(22) PCT Filed: Mar. 16, 2017

(86) PCT No.: PCT/CN2017/076883
§ 371 (c)(1),
(2) Date: Jul. 19, 2019

(87) PCT Pub. No.: WO2018/165934
PCT Pub. Date: Sep. 20, 2018

(65) Prior Publication Data
US 2019/0364456 A1    Nov. 28, 2019

(51) Int. Cl.
*H04B 7/00* (2006.01)
*H04W 28/08* (2009.01)
(Continued)

(52) U.S. Cl.
CPC ............ *H04W 28/08* (2013.01); *H04W 8/08* (2013.01); *H04W 24/08* (2013.01); *H04W 76/11* (2018.02); *H04W 76/12* (2018.02)

(58) Field of Classification Search
CPC ............ H04W 76/002; H04W 76/022; H04W 76/025; H04W 76/041; H04W 92/04
(Continued)

(56) References Cited

U.S. PATENT DOCUMENTS

| 8,432,871 B1 * | 4/2013 | Sarnaik | H04W 28/0289 370/331 |
| 8,767,728 B2 * | 7/2014 | Mihaly | H04W 8/082 370/389 |

(Continued)

FOREIGN PATENT DOCUMENTS

| CN | 101272347 A | 9/2008 |
| CN | 101309167 A | 11/2008 |

(Continued)

OTHER PUBLICATIONS

PCT/CN2017/076883, International Search Report and Written Opinion, dated Dec. 21, 2017, 11 pages.
(Continued)

Primary Examiner — Dmitry Levitan
(74) Attorney, Agent, or Firm — Stoel Rives LLP

(57) ABSTRACT

A traffic offloading function (TOF) of a mobile edge computing (MEC) platform uses a traffic forwarding table and a location database updated by monitoring control plane messages. User plane traffic in a default bearer passes through an extended TOF where the IP packets retrieved from a General Packet Radio Service Tunneling Protocol (GTP) tunnel are forwarded following a policy that is created by detecting (or sniffing) control plane messages exchanged over the S1-MME interface. An additional entity, a location database, is responsible for tracking a location of a UE and other hosts in the mobile network. The location database can be used to guide the forwarding policy creation in an absence of the control plane messages.

28 Claims, 8 Drawing Sheets

Procedure for the User Plane Path Selection

(51) Int. Cl.
*H04W 76/12* (2018.01)
*H04W 76/11* (2018.01)
*H04W 8/08* (2009.01)
*H04W 24/08* (2009.01)

(58) Field of Classification Search
USPC .............................. 370/310, 329, 336, 345
See application file for complete search history.

(56) References Cited

U.S. PATENT DOCUMENTS

| | | | | |
|---|---|---|---|---|
| 8,897,183 | B2* | 11/2014 | Andreasen | H04W 48/16 |
| | | | | 370/310 |
| 9,066,256 | B2* | 6/2015 | Huang | H04L 47/808 |
| 9,106,711 | B2* | 8/2015 | Baillargeon | H04W 76/12 |
| 9,204,336 | B2* | 12/2015 | Mihaly | H04L 29/12367 |
| 9,300,453 | B2* | 3/2016 | Kaczmarska-Wojtania | |
| | | | | H04W 76/11 |
| 2007/0097958 | A1 | 5/2007 | Lappalainen | |
| 2010/0075659 | A1* | 3/2010 | Kim | H04W 76/11 |
| | | | | 455/422.1 |
| 2013/0258963 | A1 | 10/2013 | Mihaly et al. | |
| 2019/0364456 | A1* | 11/2019 | Yu | H04W 24/08 |

FOREIGN PATENT DOCUMENTS

| | | |
|---|---|---|
| CN | 101442490 A | 5/2009 |
| CN | 101547155 A | 9/2009 |
| CN | 102833802 A | 12/2012 |
| CN | 105282816 A | 1/2016 |
| CN | 105634980 A | 6/2016 |
| WO | 2011090290 A2 | 7/2011 |
| WO | 2012022357 A1 | 2/2012 |
| WO | 2014026543 A1 | 2/2014 |

OTHER PUBLICATIONS

3GPP TS 23.060, "3rd Generation Partnership Project; Technical Specification Group Services and System Aspects; General Packet Radio Service (GPRS); Service description; Stage 2 (Release 14)", V14.3.0, Mar. 2017, 367 pages.

Zuo, Qing-Yun et al., Research on OpenFlow-Based SDN Technologies, Journal of Software, vol. 24, No. 5, May 2013, 20 pages.

* cited by examiner

System Architecture for UE-to-UE Path Selection

| Network Prefix ⟵ 202 | Output TEID ⟵ 204 | Alive Timer ⟵ 206 |
|---|---|---|
| 192.168.0.0/16 | 0x0304c757 | Null |
| 192.168.20.0/24 | 0x2d300785 | Null |
| 89.82.48.12/32 | 0x00000000 | Null |
| 192.168.10.99/32 | 0x09070399 | Active |
| 202.171.1.0/24 | 0x00000000 | Null |
| ... | ... | ... |

FIG. 2
User Plane Traffic Forwarding Table

200

FIG. 3 Procedure for the User Plane Path Selection

SYSTEMS, METHODS AND DEVICES FOR USER PLANE TRAFFIC FORWARDING

TECHNICAL FIELD

The present disclosure relates to cellular communications and more specifically to traffic offloading functions.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

BRIEF DESCRIPTION OF THE DRAWINGS

FIG. 2 is a traffic forwarding table illustrating traffic forwarding entries consistent with embodiments disclosed herein.

DETAILED DESCRIPTION

Figure 1:
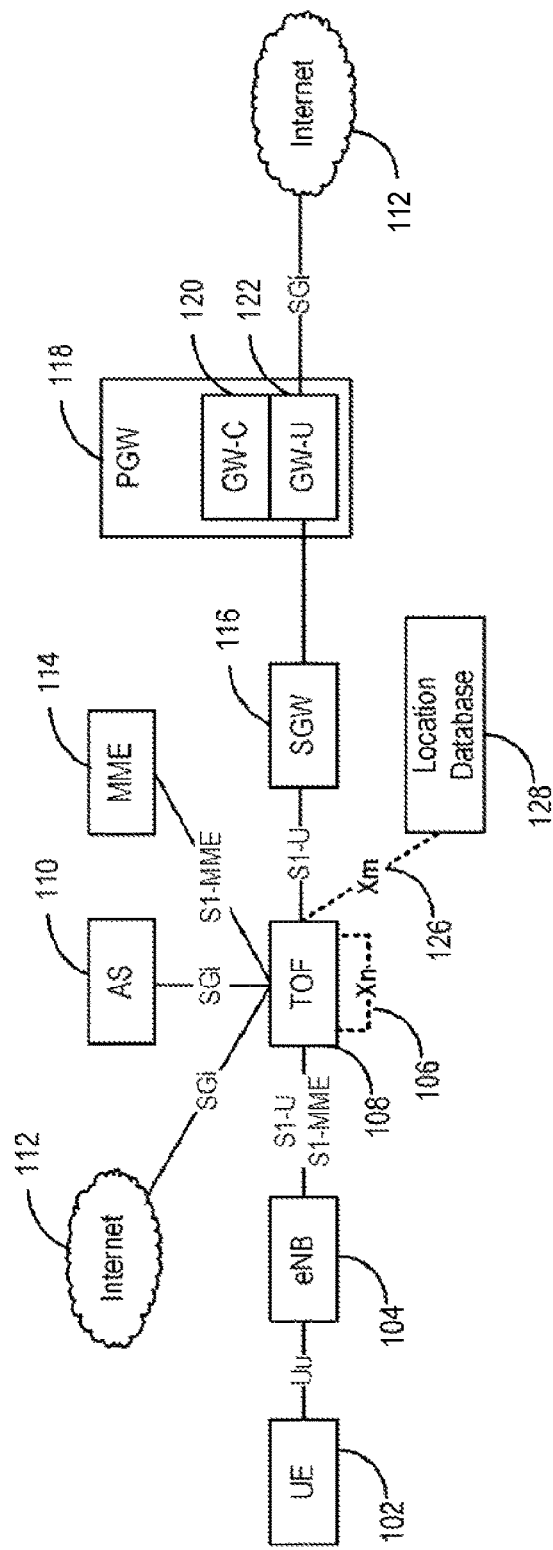
FIG. 1 is a block diagram illustrating a system architecture of a mobile communications system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a traffic offloading function (TOF) of a mobile edge computing (MEC) platform using a traffic forwarding table and a location database updated by monitoring control plane messages. User plane traffic in a default bearer passes through an extended TOF where the IP packets retrieved from a General Packet Radio Service Tunneling Protocol (GTP) tunnel are forwarded following a policy that is created by detecting (or sniffing) control plane messages exchanged over the S1-MME interface. An additional entity, a location database, is responsible for tracking a location of a UE and other hosts in the mobile network. The location database can be used to guide the forwarding policy creation in an absence of the control plane messages.

In some embodiments, the traffic offloading function (TOF) is part of a mobile edge computing (MEC) platform. TOF services can be provided by a MEC server in a virtualized environment with a MEC virtualization manager.

In some embodiments, the traffic offloading function (TOF) is extended in the existing 3GPP network to the entity capable of processing the traffic at both the S1-U and the S1-MME interface. User plane traffic in the default bearer passes through an extended TOF where the IP packets retrieved from a General Packet Radio Service Tunneling Protocol (GTP) tunnel are forwarded following a policy that is created by detecting (or sniffing) control plane messages exchanged over the S1-MME interface. An additional entity, a location database, is responsible for tracking a location of a UE and other hosts in the mobile network. The location database can be used to guide the forwarding policy creation in an absence of the control plane messages.

The proposed solution can provide advantages, which include (1) ease in default path (re)selection for third-party service providers; (2) little modification to the EPC; (3) reduced signaling overhead; and (4) session continuity during mobility.

In (1) ease in default path (re)selection for third-party service providers, an embodiment enables the significant facilitation in supporting the efficient user plane path (re) selection involving most of today's third-party mobile apps.

Since the existing third-party mobile applications can rely on the default bearer for the service delivery, it can be unfeasible for the applications to utilize the current 3GPP approaches to conduct the path selection without updating their client and server platform. This is because the existing 3GPP approaches specify that the UE should create the dedicated packet data network (PDN) connectivity enabling an efficient path with the dedicated access point name (APN).

However, some embodiments can work with these applications still running with the default bearer. This use of the default bearer can reduce the cost in supporting the efficient path selection in the viewpoint of the third-party service provider.

In (2) little modification to the evolved packet core (EPC), an embodiment introduces two new functionalities including the extended TOF and the UE location database without incurring an update in today's EPC network elements. Other existing 3GPP approaches, however, use a complicated update involving the eNB, the UE and the MME. By contrast, the embodiment can enable the efficient path selection transparent to the existing EPC network elements.

In (3) reduced signaling overhead, an embodiment yields less signaling overhead than other existing 3GPP approaches. Simple signaling can be used in the embodiment for the UE's location tracking. Other 3GPP approaches, however, use a series of signaling messages for the PDN connectivity creation to enable the efficient path selection and the UE's location tracking.

In (4) session continuity during mobility, an embodiment enables the session continuity over the efficient user plane path without an update in the UE. By contrast, the existing 3GPP approaches, such as local IP access (LIPA)/selected IP traffic offload (SIPTO), are unable to support mobility. Other approaches such as IP flow mobility and seamless offload (IFOM) and the proximity-based services (ProSe) solution can use a complicated update in the UE to support session continuity.

Embodiments herein present (re)selection of efficient user plane paths in the architecture for a Next Generation System (5G core network). These embodiments can touch on efficient U-plane setup in the 5G system involving the communication between UEs attached to the same network, between a UE and a host in the Internet, and between a UE and a service providing entity residing close to the network edge. Embodiments described herein can aid in a situation that the user plane path (re)selection is oriented to the traffic delivered with the default bearer. It enables the path (re) selection without modifying the current EPC network elements.

Several approaches for the user plane traffic control can be used, such as LIPA/SIPTO, IFOM and ProSe. LIPA/SIPTO enables the user plane traffic offloading using a local network which bypasses the EPC by introducing a dedicated APN for the special PDN connectivity between the UE and the local host. IFOM extends the IP protocol stack in the UE to the dual stack mobile IP version 6 (DSMIPv6) supporting the communication with both IPv4 and IPv6 so that the UE may adjust the user plane traffic flow. The ProSe defines the new network element to facilitate the direct communication between the UEs in the same cell coverage.

FIG. 1 is a block diagram illustrating a system architecture of a mobile communications system. A TOF 108 is extended to be the entity located between the eNB 104 and the SGW 116. The user-plane traffic along with the control plane traffic goes through the TOF 108 which is allowed to be connected with one or more eNBs 104. A user plane path is configured in the TOF 108 by referring to a location of the corresponding node including the UE 102, the host in the Internet 112 or the service providing entity (e.g., application server (AS) 110) at the network edge. The AS 110 can be treated as the edge service providing entity and the interface SGi enables a direct connection between the Internet 112 and the TOF 108.

IP addresses assigned to the UE 102 and the AS 110 may be private IP addresses in the EPC. The TOF 108 can be assigned with two IP addresses: a first address can be a private IP address in the EPC and a second address is the global IP address in the Internet 112. These two addresses allow UE 102 traffic to reach the Internet 112 or an application server 110 without going through the EPC (e.g., serving gateway 116, packet gateway 118, etc.).

An interface Xn 106 is used to create the inter-TOF GTP tunnel for direct user plane traffic forwarding between the UEs 102 for distinct eNBs 104 or indirect forwarding enabling the session continuity (such as a inter-traffic forwarding entity tunnel). The interface Xm 126 allows the TOF 108 to report or acquire the UE 102 location context to or from the location database 128 wherein the mapping between the IP address of the UE 102 and the IP address of the TOF 108 that connects the eNB that the UE attaches to is maintained.

FIG. 2 is a traffic forwarding table 200 illustrating traffic forwarding entries. The TOF conducts user plane path selection by forwarding the user plane traffic based on its user plane traffic forwarding table 200. The path selection is oriented to the uplink user-plane traffic from the UE. In other words, IP packets retrieved over the uplink GTP tunnel destined to the SGW are checked against the traffic forwarding table.

In some embodiments, a maximum prefix length match algorithm is applied in a forwarding table look up. For example, when the address 192.168.20.19 is looked up, both a first entry with a Network Prefix 202 of 192.168.0.0/16 and a second entry with a Network Prefix 202 of 192.168.0.0/24 contain the looked up address. In this case, a longest prefix of the candidate entry is 192.168.20.0/24, since its prefix is longer than the entry 192.168 .0.0/16, making the packet forwarding follow this longest entry.

An "Output TEID" 204 denotes a GTP tunnel endpoint identifier (GTP-TEID) of the tunnel through which the IP packet should be forwarded. Thus, an original TEID in the GTP packet where the matched IP packet is encapsulated should be replaced with the TEID indicated in the "Output TEID" 204 of the corresponding entry. The "Output TEID" 204 with the value of 0x00000000 indicates that the IP packet should be locally offloaded without any GTP encapsulation.

In some embodiments, an "Alive Timer" 206 in each entry is introduced to ensure a validity of a path to the destination. It can be applied to an entry corresponding to a UE in the network. The timer can be refreshed once there is a packet forwarding action following the associated entry. A timer expiration means that the data flow destined to the corresponding UE has been inactive for a threshold time. Upon the timer expiration, the corresponding entry can be deleted. In an embodiment, it is unnecessary to activate the alive timer for the entry corresponding to the edge service entity and the Internet host. The "Alive Timer" in these entries can be set as "Null."

An update on the user plane traffic forwarding table includes an entry addition and an entry deletion. An addition of an entry corresponding to the edge service entity and the Internet host can be conducted by the current TOF upon its setup so that any edge service entities and the Internet can be directly reached through the TOF. An addition of the entry corresponding to the edge service entity and the UE is conducted by the current TOF with the notification from the location database. A deletion of an entry is triggered by the detection of a host departure or the termination of a tunnel with a TEID that is indicated in the "Output TEID." A host departure can be determined based on a monitoring (or sniffing) of the control plane messages.

Figure 3:
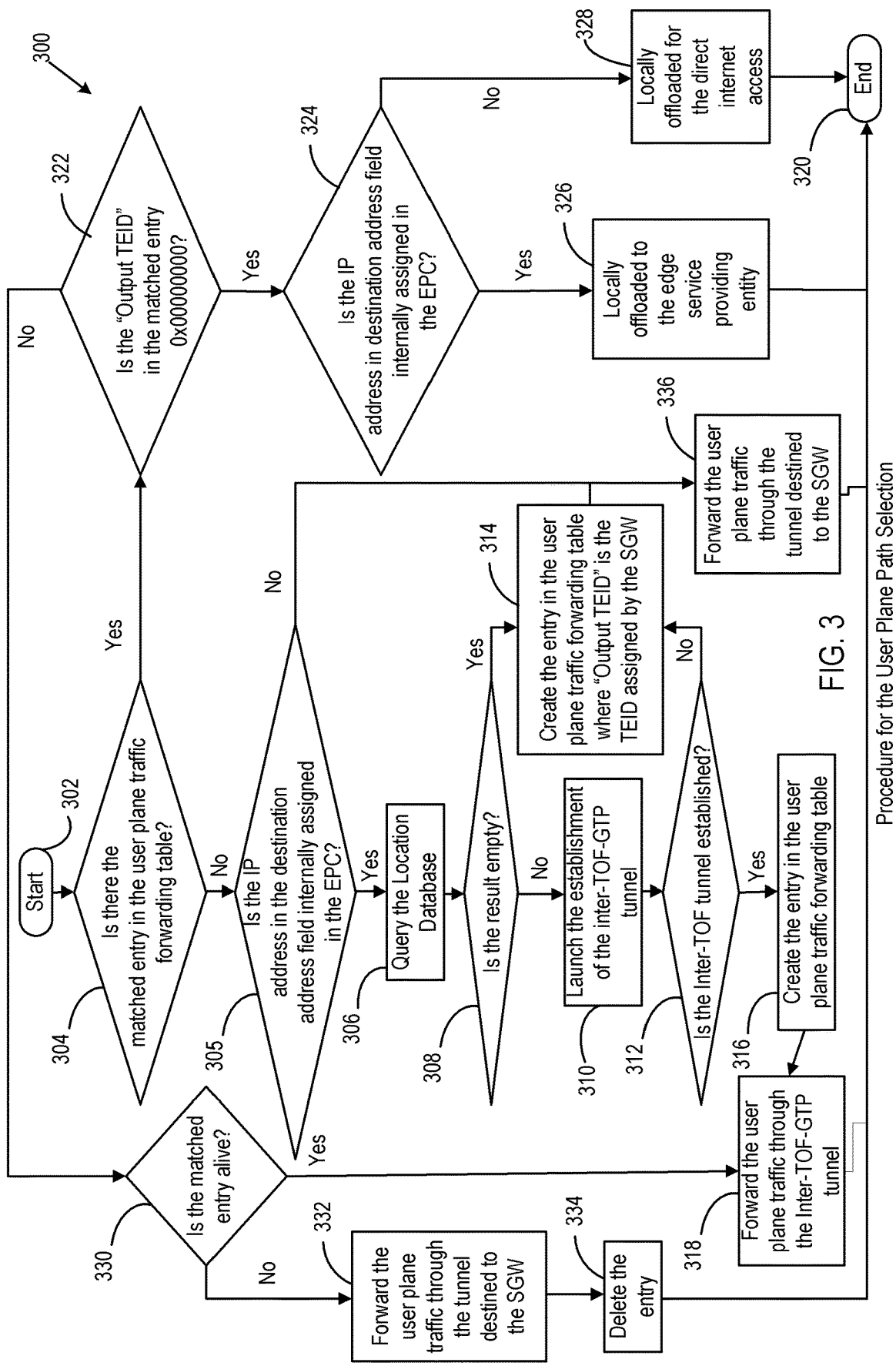
FIG. 3 is a flow chart illustrating a procedure for user plane path selection consistent with embodiments disclosed herein.

FIG. 3 is flow chart 300 illustrating a procedure for user plane path selection. In one embodiment, path selection is conducted as shown in FIG. 3. Three cases are taken into account for the selection: (1) communication with edge service providing entity; (2) communication with the UE in the same network; and (3) communication with the host in the Internet.

In regards to (1) communication with edge service providing entity, each TOF is configured with the knowledge about the network prefix of the IP addresses assigned to its edge service providing entities. An IP address of the edge service entity is internally assigned in the EPC. There is a corresponding entry oriented to these edge service entities. For instance, assuming 32 hosts deployed as the edge entities with IP addresses ranging from 192.168.0.1 to 192.168.0.32, the TOF creates an entry denoted as {"Network Prefix": 192.168.0.0/27, "Output TEID": 0x00000000} in the traffic forwarding table.

After retrieving the IP packet over the uplink GTP tunnel, the TOF conducts 304 a forwarding table look up. Given that it matches 322 the entry corresponding to the edge service entity, the IP packet is locally offloaded 326 without any GTP encapsulation.

In regards to (2) communication with the UE in the same network, the entry oriented to the UE in the same network is expressed as {"Network Prefix": a.b.c.d/32, "Output TEID": TEID with the corresponding TOF} where a.b.c.d refers to IP addresses assigned to the UE and the corresponding TOF refers to the TOF that is capable of delivering the user plane traffic destined to the UE without involving the PGW. The UE-to-UE communication is thereby allowed to transverse the inter-TOF GTP tunnel bypassing the PGW. The user plane traffic destined to the corresponding UE should be encapsulated for the delivery in the tunnel whose TEID is assigned by the corresponding TOF.

For example, the TOF conducts 304 a forwarding table look up. If the destination UE address is 304 in the table, and the Output TEID is not 322 a reserved value and is alive 330, then the packet is forwarded 318 through an Inter-TOF-GTP tunnel. If the destination UE address is not 304 in the table, but the address is internally assigned 305 in the EPC, the location database is queried 306 for the UE. If the result is not empty 308, an inter-TOF-GTP tunnel is established 312, an entry in the table is created 316 and the user-plane traffic is forwarded 318 through the Inter-TOF-GTP tunnel to the UE. Otherwise, the entry in the forwarding table is a TEID assigned 314 by the SGW and the user plane traffic is sent 336 through the tunnel destined to the SGW.

In regards to (3) communication with the host in the Internet, the entry oriented to the host in the Internet should be expressed as {"Network Prefix": Network prefix of global IP address of the TOF, "Output TEID": 0x00000000}. It enables the IP packet with the network prefix that is the same as that of the global IP address assigned to the TOF to be offloaded for the direct Internet access.

After retrieving the IP packet over the uplink GTP tunnel, the TOF conducts 304 a forwarding table look up. Given that it does not match 322 the entry corresponding to an internally assigned address field, the IP packet is locally offloaded 328 to the Internet without any GTP encapsulation.

A location database is responsible for tracking the location of the UE and the edge service entity whose IP address is internally assigned in the EPC. The record oriented to the specific host is expressed as {MME UE S1AP ID, E-RAB ID, IP Address of TOF, Network Prefix of Host}. "IP Address of TOF" refers to the IP address of the TOF enabling the efficient path to the indicated UE or hosts. "Network Prefix of Host" refers to the network prefix of the IP address of the host that can be the UE or the edge service entity. "E-RAB ID" refers to the identifier of the default bearer in the EPC. Given the record corresponding to the edge service entity, the "E-RAB ID" and "MME UE S1AP ID" should be null.

A query from the TOF may include one of the elements including "Network Prefix of Host," "MME UE S1AP ID" and "E-RAB ID," while the response from the location database indicates the complete record including MME UE S1AP ID, E-RAB ID, IP Address of TOF, and Network Prefix of Host. The location database should use the element in the TOF's query as the index to update its records and conduct the response.

The location database updates its records with the report message from the TOF. One of the elements including MME UE S1AP ID, E-RAB ID and Network Prefix of Host can be used by the location database as the index for the record update. The element for the update should be indicated in the report from the TOF. The updated record expressed as {MME UE S1AP ID, E-RAB ID, IP Address of TOF, Network Prefix of Host} should be issued as the response to the report of the TOF.

The location database should notify a departure of a specific UE to the TOF with an IP address that is included in the current record given that it receives the UE attaching report from another different TOF. The TOF which has been notified with the UE departure rejects the tunnel establish request destined to the departing UE.

The system can also include a location report from the TOF. The TOF initiates the report regarding the edge service entity upon its deployment. The report regarding the UE is sent from the TOF after the detection of the change in the UE location which is enabled by sniffing the control plane messages including Activate Default Bearer Request, Initial Context Setup Response, UE Context Release Complete and Path Switch Acknowledge. The report message should contain at least one of the elements including "Network Prefix of Host," MME UE S1AP ID and E-RAB ID.

After monitoring the Activate Default Bearer Request, the TOF is aware of the IP address of the attached UE and the E-RAB ID of the default bearer. The monitoring of the Initial Context Setup Response enables the awareness of the MME UE S1AP ID, E-RAB ID list including the E-RAB ID and the uplink GTP TEID for the default bearer and eNB UE S1AP ID. The Path Switch Acknowledge monitored in the TOF notifies the context elements that are the same as those achieved in the Initial Context Setup Response. The UE Context Release Complete monitoring enables the TOF to be aware of the UE departing from the connected eNB.

With the information acquired by the control plane message monitoring, the TOF updates the context of each host that may include the UE attached to a connecting eNB. The edge service entity or the Internet host facilitates the report to the location database and the user plane traffic forwarding. The host context is expressed as {MME UE S1AP ID, E-RAB ID eNB UE S1AP ID, IP Address of UE, IP Address of the eNB, uplink GTP TEID} where uplink GTP TEID is the TEID assigned by the SGW for the S1 bearer. The context of the specific host can be indexed with the coupling of <eNB UE S1AP ID, IP Address of the eNB>, E-RAB ID or Network Prefix of Host. Given the detection of the host departure, the TOF should delete the corresponding context. Given the detection of the host attachment, the TOF should create the corresponding context.

In addition to the update enabled by the monitoring of the control plane message, the TOF may further build the context of the host with the response from the location database after issuing the location report or the location query.

The location report can provide information about (1) the edge service entity and the Internet host or (2) the UE. Regarding (1) the edge service entity and the Internet host, the TOF may conduct the report about the location of the edge service entity and the Internet host upon its setup. The report message indicating the Network Prefix of Host is used to notify the location database that the current TOF may enable the efficient path to these hosts. Given a failure of the specific edge service entity, the TOF should send the report to delete the records corresponding to these hosts and keep the records corresponding to the hosts in the normal operation.

Regarding (2) the UE, the TOF should send the report about the UE attachment after capturing MME UE S1AP ID by sniffing the Path Switch Acknowledge or the Initial Context Setup Response. In some embodiments, there is no report regarding the UE departure for the UE-to-UE communication. The TOF is aware of the departure of the specific UE with the notification of the location database.

An inter-TOF tunnel establishment request indicates at least one of the elements including MME UE S1AP ID, E-RAB ID, eNB UE S1AP ID and Network Prefix of Host. The corresponding TOF should reject the request, given that it has no context of the host corresponding to the elements indicated in the request. The inter-TOF tunnel should be closed given any host in the communication is detected to depart from the TOF.

Figure 4:
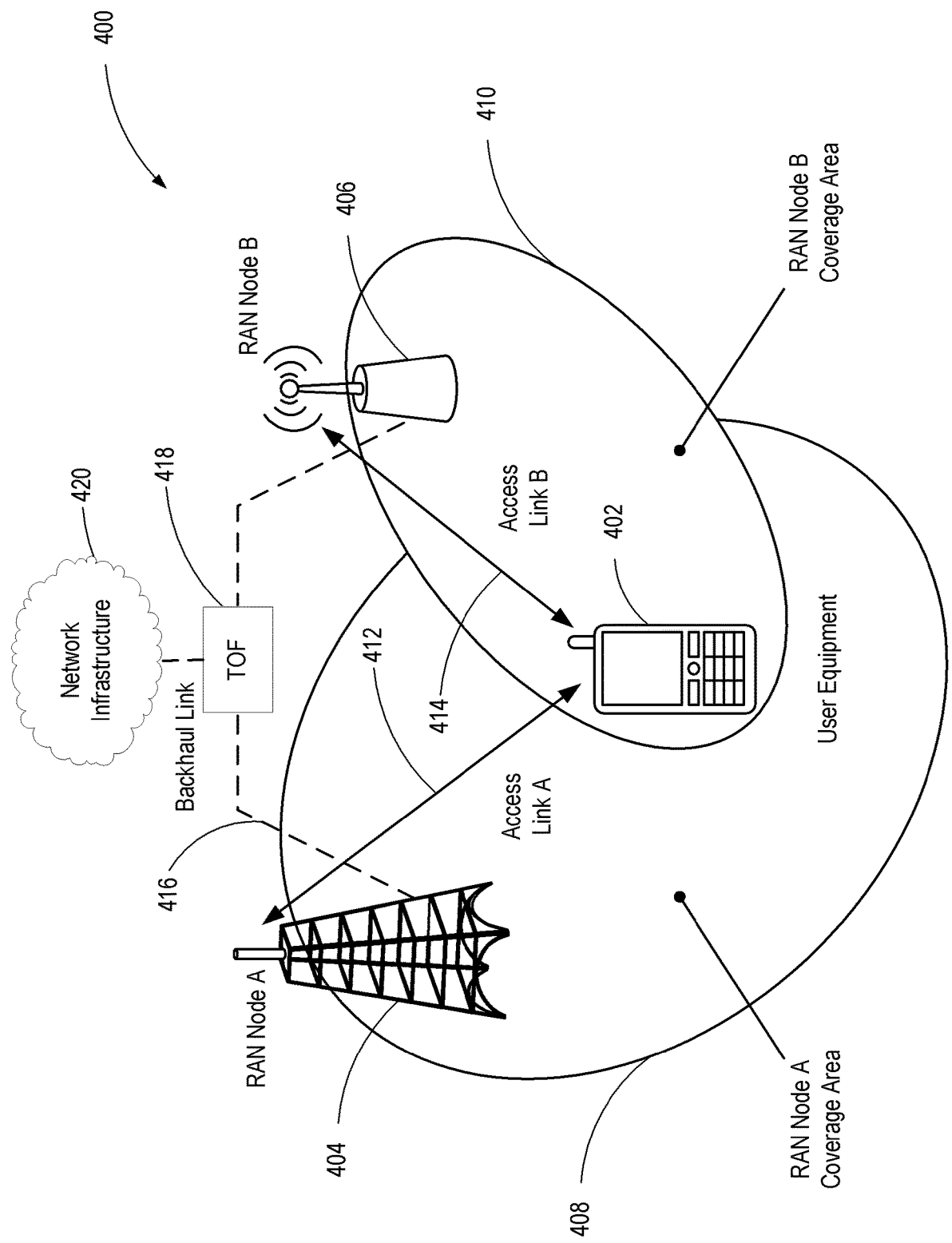
FIG. 4 is a diagram illustrating a portion of a radio access network (RAN) system consistent with embodiments disclosed herein.

FIG. 4 is an example of a portion of a radio access network (RAN) system 400 that includes a cellular air interface (such as an LTE/LTE-Advanced access link) being provided between RAN Node A 104 and the UE 102 (i.e., on Access Link A), and a second air interface (such as a second cellular access interface, a supplemental network interface such as a wireless local area network (WLAN) based interface, etc.) being provided between the RAN Node B 406 and the UE 402 (i.e., on Access Link B). UE 402 is located within macro cell coverage 408. The UE 402 determines that connection with a RAN Node B 406 will be beneficial to a user of the UE 402. In some embodiments, the UE 402 retains Access Link A to RAN Node B 404. The UE 402 can offload some or part of wireless services onto Access Link A. In other embodiments, the UE 402 disconnects from Access Link A and moves wireless services to Access Link B. In some embodiments Access Link A and Access Link B use a same frequency and technology. In other embodiments, Access Link A and Access Link B use different frequencies (e.g., LTE licensed frequencies and unlicensed frequencies) and different link technology (e.g., LTE and Wi-Fi). In other embodiments, Access Link A and Access Link B use different frequencies and similar link technology (e.g., LTE and LTE over mmWave). RAN Node A 404 and RAN Node B 406 can be networked with TOF 418, which sits between RAN Node A 404 and RAN Node B 406 and other network infrastructure as seen in FIG. 1.

Figure 5:
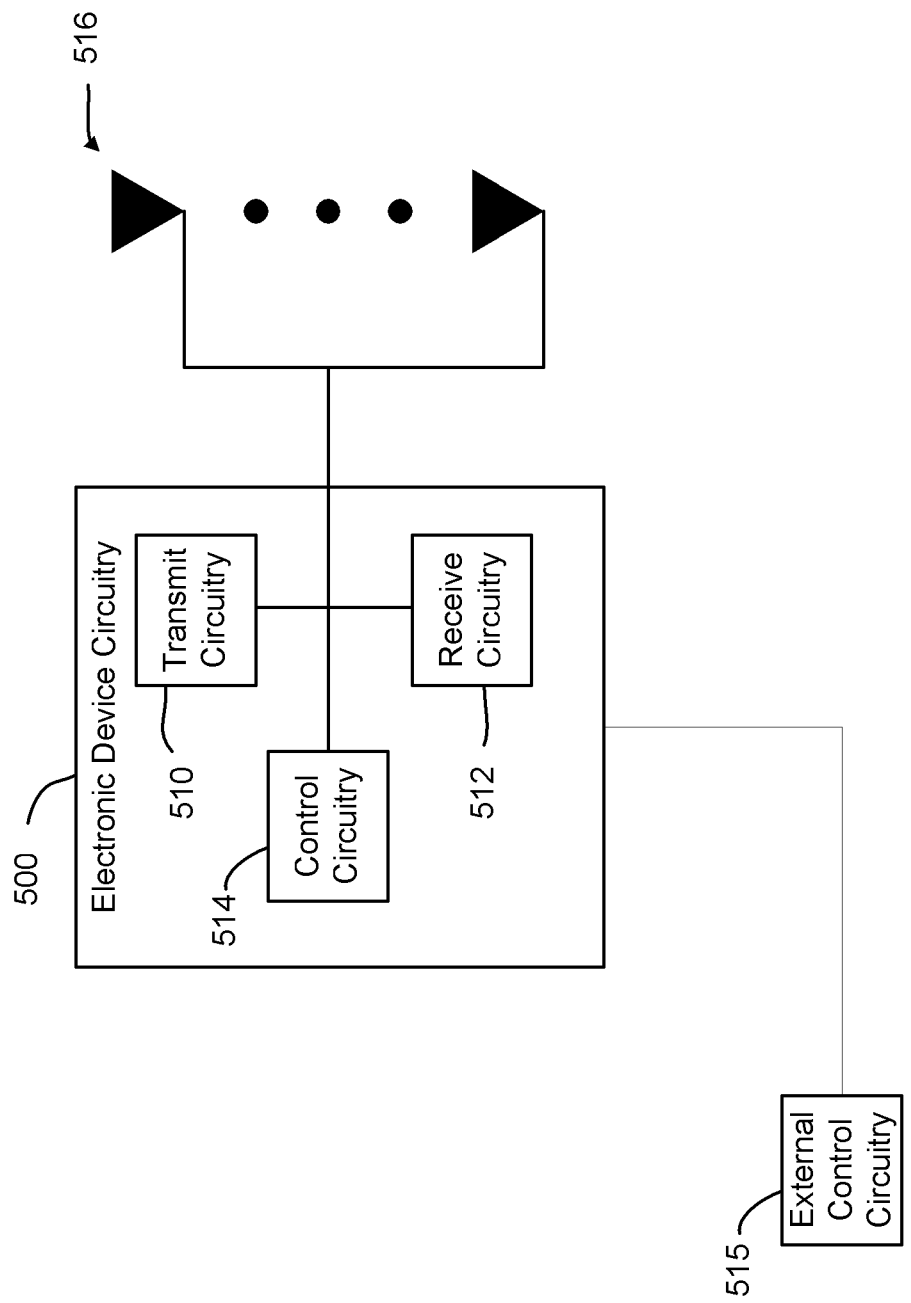
FIG. 5 is a block diagram illustrating electronic device circuitry consistent with embodiments disclosed herein.

FIG. 5 is a block diagram illustrating electronic device circuitry 500 that may be radio access node (RAN) node circuitry (such as an eNB circuitry), UE circuitry, network node circuitry, or some other type of circuitry in accordance with various embodiments. In embodiments, the electronic device circuitry 500 may be, or may be incorporated into or otherwise a part of, a RAN Node (e.g., an eNB), a UE, a mobile station (MS), a BTS, a network node, or some other type of electronic device. In embodiments, the electronic device circuitry 500 may include radio transmit circuitry 510 and receive circuitry 512 coupled to control circuitry 514 (e.g., baseband processor(s), etc.). In embodiments, the transmit circuitry 510 and/or receive circuitry 512 may be elements or modules of transceiver circuitry, as shown. In some embodiments, some or all of the control circuitry 515 can be in a device separate or external from the transmit circuitry 510 and the receive circuitry 512 (baseband processors shared by multiple antenna devices, as in cloud-RAN (C-RAN) implementations, for example).

The electronic device circuitry 510 may be coupled with one or more plurality of antenna elements 516 of one or more antennas. The electronic device circuitry 500 and/or the components of the electronic device circuitry 500 may be configured to perform operations similar to those described elsewhere in this disclosure.

In embodiments where the electronic device circuitry 500 is or is incorporated into or otherwise part of a UE, the transmit circuitry 510 can transmit messages routed by the TOF as shown in FIGS. 1 and 3. The receive circuitry 512 can receive messages routed by the TOF as shown in FIGS. 1 and 3.

In embodiments where the electronic device circuitry 500 is an eNB, BTS, TOF and/or a network node, or is incorporated into or is otherwise part of an eNB, BTS and/or a network node, the transmit circuitry 510 can transmit routed messages as shown in FIGS. 1 and 3. The receive circuitry 512 can receive messages to route as shown in FIGS. 1 and 3.

In certain embodiments, the electronic device circuitry 500 shown in FIG. 5 is operable to perform one or more methods, such as the methods shown in FIG. 3.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
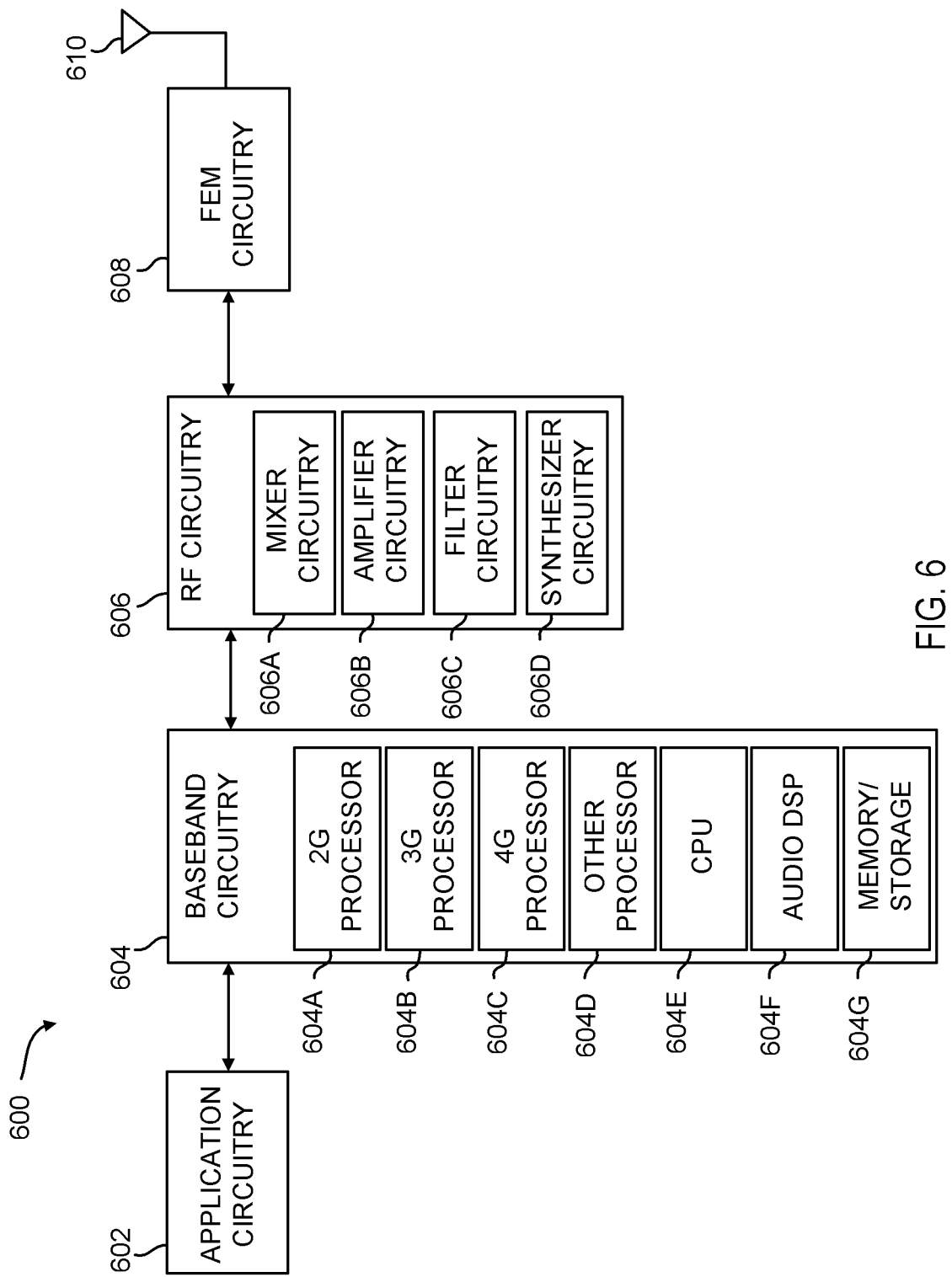
FIG. 6 is a block diagram illustrating, for one embodiment, example components of a user equipment (UE) or mobile station (MS) device consistent with embodiments disclosed herein.

Embodiments described herein may be implemented into a system using any suitably configured hardware and/or software. FIG. 6 is a block diagram illustrating, for one embodiment, example components of a user equipment (UE), traffic offloading function (TOF) of a mobile edge computing (MEC) platform or mobile station (MS) device 600. In some embodiments, the device 600 may include application circuitry 602, baseband circuitry 604, Radio Frequency (RF) circuitry 606, front-end module (FEM) circuitry 608, and one or more antennas 610, coupled together at least as shown in FIG. 6. Some devices may contain only some of the components listed. For example, a TOF may include application circuitry 602, but not one or more antennas 610.

The application circuitry 602 may include one or more application processors. By way of non-limiting example, the application circuitry 602 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 604 may include one or more single-core or multi-core processors. The baseband circuitry 604 may include one or more baseband processors and/or control logic. The baseband circuitry 604 may be configured to process baseband signals received from a receive signal path of the RF circuitry 606. The baseband 604 may also be configured to generate baseband signals for a transmit signal path of the RF circuitry 606. The baseband processing circuitry 604 may interface with the application circuitry 602 for generation and processing of the baseband signals, and for controlling operations of the RF circuitry 606.

By way of non-limiting example, the baseband circuitry 604 may include at least one of a second generation (2G) baseband processor 604A, a third generation (3G) baseband processor 604B, a fourth generation (4G) baseband processor 604C, other baseband processor(s) 604D for other existing generations, and generations in development or to be developed in the future (e.g., fifth generation (5G), 6G, etc.). The baseband circuitry 604 (e.g., at least one of baseband processors 604A-604D) may handle various radio control functions that enable communication with one or more radio networks via the RF circuitry 606. By way of non-limiting example, the radio control functions may include signal modulation/demodulation, encoding/decoding, radio frequency shifting, other functions, and combinations thereof. In some embodiments, modulation/demodulation circuitry of the baseband circuitry 604 may be programmed to perform Fast-Fourier Transform (FFT), precoding, constellation mapping/demapping functions, other functions, and combinations thereof. In some embodiments, encoding/decoding circuitry of the baseband circuitry 604 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 604 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604E of the baseband circuitry 604 may be programmed to run elements of the protocol stack for signaling of the PHY, MAC, RLC, PDCP and/or RRC layers. In some embodiments, the baseband circuitry 604 may include one or more audio digital signal processor(s) (DSP) 604F. The audio DSP(s) 604F may include elements for compression/decompression and echo cancellation. The audio DSP(s) 604F may also include other suitable processing elements.

The baseband circuitry 604 may further include memory/storage 604G. The memory/storage 604G may include data and/or instructions for operations performed by the processors of the baseband circuitry 604 stored thereon. In some embodiments, the memory/storage 604G may include any combination of suitable volatile memory and/or non-volatile memory. The memory/storage 604G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 604G may be shared among the various processors or dedicated to particular processors.

Components of the baseband circuitry 604 may be suitably combined in a single chip, a single chipset, or disposed on a same circuit board in some embodiments. In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

The RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. The RF circuitry 606 may include a receive signal path which may include circuitry to down-convert RF signals received from the FEM circuitry 608, and provide baseband signals to the baseband circuitry 604. The RF circuitry 606 may also include a transmit signal path which may include circuitry to up-convert baseband signals provided by the baseband circuitry 604, and provide RF output signals to the FEM circuitry 608 for transmission.

In some embodiments, the RF circuitry 606 may include a receive signal path and a transmit signal path. The receive signal path of the RF circuitry 606 may include mixer circuitry 606A, amplifier circuitry 606B, and filter circuitry 606C. The transmit signal path of the RF circuitry 606 may include filter circuitry 606C and mixer circuitry 606A. The RF circuitry 606 may further include synthesizer circuitry 606D configured to synthesize a frequency for use by the mixer circuitry 606A of the receive signal path and the transmit signal path. In some embodiments, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals.

The filter circuitry 606C may include a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may include zero-frequency baseband signals, although this is not a requirement. In some embodiments, the mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by filter circuitry 606C. The filter circuitry 606C may include a low-pass filter (LPF), although the scope of the embodiments is not limited in this respect. In some embodiments, the mixer circuitry 606A of the receive signal path and the mixer circuitry 606A of the transmit signal path may include two or more mixers, and may be arranged for quadrature downconversion and/or upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A may be arranged for direct downconversion and/or direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 606 may include analog-to-digital converter (ADC) and digital-to-analog converter (DAC) circuitry, and the baseband circuitry 604 may include a digital baseband interface to communicate with the RF circuitry 606.

In some dual-mode embodiments, separate radio IC circuitry may be provided for processing signals for each spectrum, although the scope of the embodiments is not limited in this respect.

In some embodiments, the synthesizer circuitry 606D may include one or more of a fractional-N synthesizer and a fractional N/N+1 synthesizer, although the scope of the embodiments is not limited in this respect as other types of frequency synthesizers may be suitable. For example, synthesizer circuitry 606D may include a delta-sigma synthesizer, a frequency multiplier, a synthesizer comprising a phase-locked loop with a frequency divider, other synthesizers and combinations thereof.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

The synthesizer circuitry 606D of the RF circuitry 606 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 606D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

The FEM circuitry 608 may include a receive signal path which may include circuitry configured to operate on RF signals received from one or more antennas 610, amplify the received signals, and provide the amplified versions of the received signals to the RF circuitry 606 for further processing. The FEM circuitry 608 may also include a transmit signal path which may include circuitry configured to amplify signals for transmission provided by the RF circuitry 606 for transmission by at least one of the one or more antennas 610.

In some embodiments, the FEM circuitry 608 may include a TX/RX switch configured to switch between a transmit mode and a receive mode operation. The FEM circuitry 608 may include a receive signal path and a transmit signal path. The receive signal path of the FEM circuitry 608 may include a low-noise amplifier (LNA) to amplify received RF signals and provide the amplified received RF signals as an output (e.g., to the RF circuitry 606). The transmit signal path of the FEM circuitry 608 may include a power amplifier (PA) configured to amplify input RF signals (e.g., provided by RF circuitry 606), and one or more filters configured to generate RF signals for subsequent transmission (e.g., by one or more of the one or more antennas 610.

In some embodiments, the MS device 600 may include additional elements such as, for example, memory/storage, a display, a camera, one of more sensors, an input/output (I/O) interface, other elements, and combinations thereof.

In some embodiments, the MS device 600 may be configured to perform one or more processes, techniques, and/or methods as described herein, or portions thereof.

Figure 7:
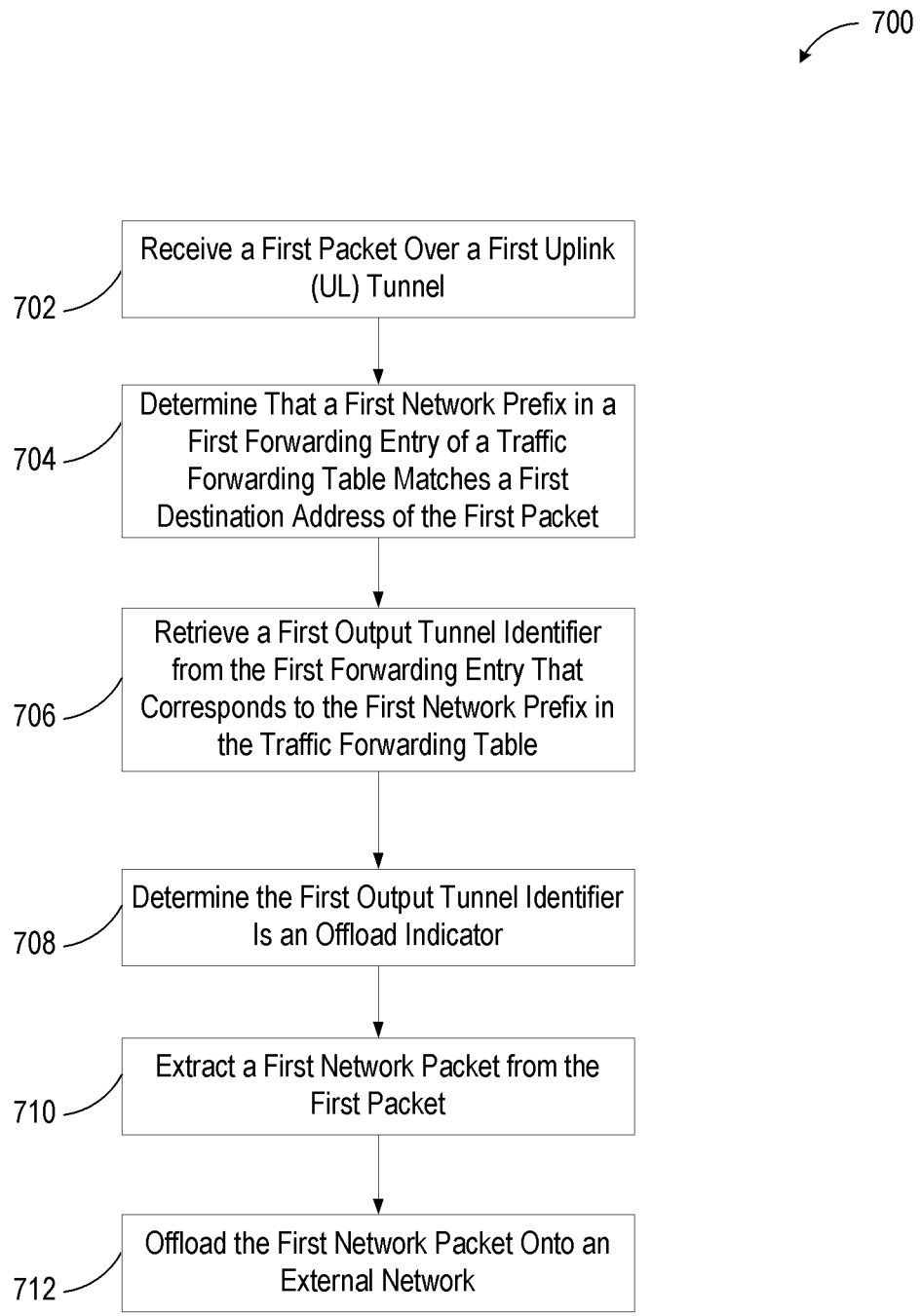
FIG. 7 is a flow chart illustrating a procedure for user plane path selection consistent with embodiments disclosed herein.

FIG. 7 is a method 700 of user plane traffic forwarding. The method can be accomplished using systems such as those shown in FIG. 1, including the TOF 108, eNB 104, UE 102, AS 110, SGW 116 and others. In block 702, a TOF receives a first packet over a first uplink (UL) tunnel. In block 704, the TOF determines that a first network prefix in a first forwarding entry of a traffic forwarding table matches a first destination address of the first packet. In block 706, the TOF retrieves a first output tunnel identifier from the first forwarding entry that corresponds to the first network prefix in the traffic forwarding table. In block 708, the TOF determines that the first output tunnel identifier is an offload indicator. In block 710, the TOF extracts a first network packet from the first packet. In block 712, the TOF offloads the first network packet onto an external network.

Figure 8:
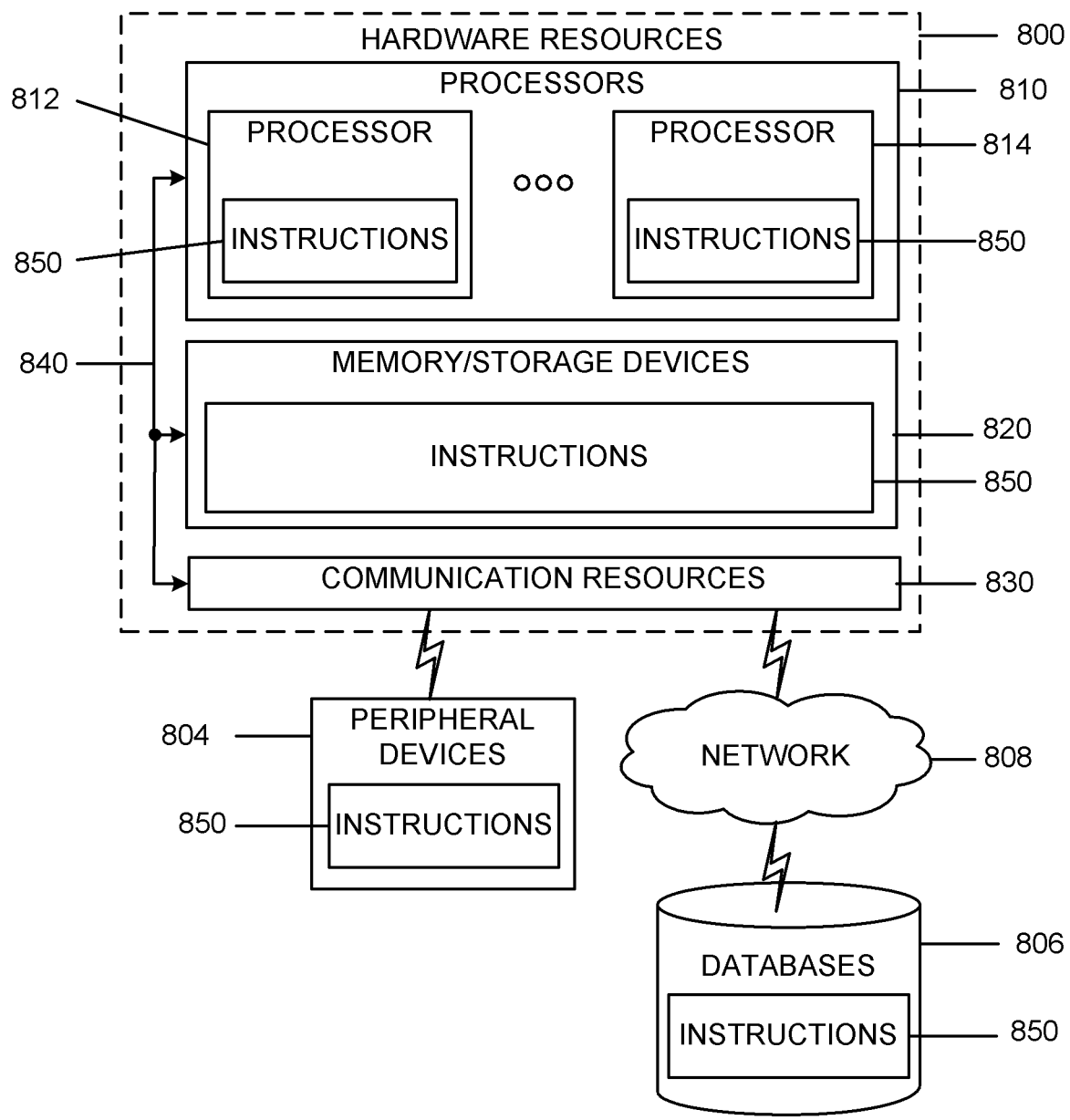
FIG. 8 is a block diagram illustrating components able to read instructions from a machine-readable or computer-readable medium consistent with embodiments disclosed herein.

FIG. 8 is a block diagram illustrating components, according to some example embodiments, able to read instructions from a machine-readable or computer-readable medium (e.g., a machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which are communicatively coupled via a bus 840.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814. The memory/storage devices 820 may include main memory, disk storage, or any suitable combination thereof.

The communication resources 830 may include interconnection and/or network interface components or other suitable devices to communicate with one or more peripheral devices 804 and/or one or more databases 806 via a network 808. For example, the communication resources 830 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 and/or the databases 806. Accordingly, the memory of processors 810, the memory/storage devices 820, the peripheral devices 804, and the databases 806 are examples of computer-readable and machine-readable media.

EXAMPLES

The following examples pertain to further embodiments.

Example 1 is a traffic offloading function (TOF) system. The TOF is for selecting efficient user plane paths in a core network supporting wireless cellular communication including storage for a user plane traffic forwarding table designed to store a set of forwarding entries, the forwarding entries comprising a network prefix entry and an output tunnel endpoint identifier (TEID) entry. The TOF is for selecting efficient user plane paths in a core network supporting wireless cellular communication including a processing unit designed to receive a general packet radio service tunneling protocol (GTP) packet over an uplink (UL) GTP tunnel, determine that a network prefix in a forwarding entry of the user plane traffic forwarding table matches a destination Internet Protocol (IP) address of the GTP packet, and retrieve an output TEID from the forwarding entry that corresponds to the network prefix in the user plane traffic forwarding table. The TOF is for selecting efficient user plane paths in a core network supporting wireless cellular communication including a processing unit designed to when the output TEID is an offload indicator; remove a GTP encapsulation of the GTP packet to form an IP packet, offload the IP packet onto an external network. The TOF is for selecting efficient user plane paths in a core network supporting wireless cellular communication including a processing unit designed to when the output TEID is a valid TEID: replace a TEID of the GTP packet with the output TEID to form a modified GTP packet and forward the modified GTP packet.

Example 2 is the system of Example 1, where the external network is the Internet.

Example 3 is the system of Example 1, where the external network includes an application server.

Example 4 is the system of Example 3, where to offload the IP packet onto the external network further includes to determine a TOF node associated with the destination IP address of an edge service provided to the application server, and forward the IP packet to the TOF node.

Example 5 is the system of Example 1, further comprising storage for a location database designed to store location data of user equipments (UEs).

Example 6 is the system of Example 5, where to forward the modified GTP packet further includes to: determine a location of a destination UE associated with the modified GTP packet based at least in part on the location data from the location database, determine a TOF node associated with the destination UE of the modified GTP packet, and forward the IP packet to the TOF node.

Example 7 is the system of Example 5, where the processing unit is further designed to inspect control plane messages to determine location information of a UE and populate the location database with the location information of the UE.

Example 8 is the system of Example 7, where the control plane messages include Activate Default Bearer Request messages, Initial Context Setup Response messages, UE Context Release Complete messages or Path Switch Acknowledge messages.

Example 9 is the system of Example 7, where to determine the location information of the UE further includes to determine an IP address of the UE, evolved universal mobile telecommunications system terrestrial radio access network (E-UTRAN) radio access bearer identifier (E-RAB ID) of a default bearer of the UE, mobility management entity (MME) UE S1 application protocol (S1AP) ID associated with the UE, E-RAB ID list, E-RAB ID, uplink GTP TEID of the default bearer of the UE, or an enhanced node B (eNB) UE S1AP ID.

Example 10 is an apparatus of a traffic offloading function (TOF) node. The apparatus supports wireless cellular communication, including a location database interface designed to be coupled to a location database and designed to access location data of user equipments (UEs) and a forwarding table interface designed to be coupled to storage for a user plane traffic forwarding table and designed to access a set of entries of the user plane traffic forwarding table, the entries comprising a network address entry and a tunnel identifier entry. The apparatus supports wireless cellular communication, including a processing unit coupled to the location database interface and the forwarding table interface, the processing unit designed to; receive a tunnel packet from a first UE, determine that a network prefix in the user plane traffic forwarding table matches a destination network address of the tunnel packet, and retrieve a tunnel identifier that corresponds to the network prefix in the user plane traffic forwarding table. The apparatus supports wireless cellular communication, including a processing unit coupled to the location database interface and the forwarding table interface, the processing unit designed to when the tunnel identifier is an offload indicator determines a first TOF node identifier that services a destination Internet Protocol (IP) address of the tunnel packet. The apparatus supports wireless cellular communication, including a processing unit coupled to the location database interface and the forwarding table interface, the processing unit designed to when the first TOF node identifier identifies the TOF node: extract a network packet from the tunnel packet and offload the network packet onto an external network. The apparatus supports wireless cellular communication, including a processing unit coupled to the location database interface and the forwarding table interface, the processing unit designed to when the first TOF node identifier identifies an external TOF node forward the tunnel packet to the external TOF node. The apparatus supports wireless cellular communication, including a processing unit coupled to the location database interface and the forwarding table interface, the processing unit designed to when the tunnel identifier is a valid tunnel identifier replace a first tunnel identifier of the tunnel packet with the tunnel identifier to form a modified tunnel packet. The apparatus supports wireless cellular communication, including a processing unit coupled to the location database interface and the forwarding table interface, the processing unit designed to when the tunnel identifier is associated with a second UE determine a location of the second UE associated with the tunnel packet based at least in part on the location data from the location database, determine a TOF node associated with the second UE, and forward the tunnel packet to the TOF node. The apparatus supports wireless cellular communication, including a processing unit coupled to the location database interface and the forwarding table interface, the processing unit designed to when the tunnel identifier is not associated with the second UE, forward the modified tunnel packet.

Example 11 is the apparatus of Example 10, where the TOF node is designed to service network traffic for one or more enhanced Node Bs (eNBs).

Exampled 12 is the apparatus of Example 10, where the tunnel packet is a general packet radio service tunneling protocol (GTP) packet and the tunnel identifier is a tunnel endpoint identifier (TEID).

Exampled 13 is the apparatus of Example 10, where the destination network address is an Internet Protocol (IP) address and the network packet is an IP packet.

Example 14 is the apparatus of Example 10, where the processing unit is further designed to determine that the external network is serviced by the TOF node, and generate a message to notify the location database of the external network serviced by the TOF node.

Example 15 is the apparatus of Example 10, where the external network is an Internet host.

Example 16 is the apparatus of Example 10, where the processing unit is further designed to determine that an edge service entity is serviced by the TOF node and generate a message to notify the location database of the edge service entity serviced by the TOF node.

Example 17 is the apparatus of Example 16, where the processing unit is further designed to determine a failure of the edge service entity serviced by the TOF node and generate a delete request to the location database to delete records of the edge service entity being serviced by the TOF node.

Example 18 is the apparatus of Example 10, where the processing unit is further designed to inspect control plane messages to determine location information of a UE and populate the location database with the location information of the UE.

Example 19 is the apparatus of any of Examples 10-18, where the processing unit is further designed to establish an inter-TOF tunnel between TOF nodes.

Example 20 is the apparatus of any of Examples 10-18, where to establish an inter-TOF tunnel between TOF nodes further includes to indicate at least one of mobility management entity (MME) UE S1 application protocol (S1AP) ID, evolved universal mobile telecommunications system terrestrial radio access network (E-UTRAN) radio access bearer identifier (E-RAB ID), enhanced Node B (eNB) UE S1AP ID or a host network prefix.

Example 21 is a computer program product including a computer-readable storage medium that stores instructions for execution by a processor to perform operations of a traffic forwarding entity of a cellular communications network, the operations, when executed by the processor, to perform a method. The method includes receiving a first packet over a first uplink (UL) tunnel, determine that a first network prefix in a first forwarding entry of a traffic forwarding table matches a first destination address of the first packet, and retrieve a first output tunnel identifier from the first forwarding entry that corresponds to the first network prefix in the traffic forwarding table. The method includes to determining that the first output tunnel identifier is an offload indicator, extract a first network packet from the first packet, and offload the first network packet onto an external network.

Example 22 is the computer program product of Example 21, where the method further includes receiving a second packet over a second uplink (UL) tunnel, determining that a second network prefix in a second forwarding entry of a traffic forwarding table matches a second destination address of the second packet, and retrieving a second output tunnel identifier from the second forwarding entry that corresponds to the second network prefix in the traffic forwarding table. The method further includes determining that the second output tunnel identifier is the offload indicator, determining that the second destination address is serviced by another traffic forwarding entity based at least in part on the traffic forwarding table, and forwarding the second packet to the another traffic forwarding entity.

Example 23 is the computer program product of Example 21, where the method further includes receiving a second packet over a second uplink (UL) tunnel, determining that a second network prefix in a second forwarding entry of a traffic forwarding table matches a second destination address of the second packet, and retrieving a second output tunnel identifier from the second forwarding entry that corresponds to the second network prefix in the traffic forwarding table. The method further includes determining that the second output tunnel identifier is a valid tunnel identifier, replacing a tunnel identifier of the second packet with the second output tunnel identifier to form a modified tunnel packet, and forwarding the modified tunnel packet based at least in part on the second output tunnel identifier.

Example 24 is the computer program product of Example 21, where the method further includes receiving a second packet over a second uplink (UL) tunnel, determining that a second network prefix in a second forwarding entry of a traffic forwarding table matches a second destination address of the second packet, and retrieving a second output tunnel identifier from the second forwarding entry that corresponds to the second network prefix in the traffic forwarding table. The method further includes determining that the second output tunnel identifier is associated with a UE, replacing a tunnel identifier of the second packet with the second output tunnel identifier to form a modified tunnel packet, and forwarding the modified tunnel packet to the UE based at least in part on the second output tunnel identifier.

Example 25 is the computer program product of Example 24, where to forward the modified tunnel packet to the UE further includes to forward the modified tunnel packet to another traffic forwarding entity using an inter-traffic forwarding entity tunnel for delivery to the UE.

Example 26 is the computer program product of Example 25, where to forward the modified tunnel packet further includes to bypass a packet data network (PDN) gateway (PGW).

Example 27 is the computer program product of Example 21, where the method further includes receiving a second packet over a second uplink (UL) tunnel, determining that a second network prefix is not present within a traffic forwarding table, and forwarding the second packet to an enhanced packet core.

Example 28 is the computer program product of Example 21, where the first network packet is an Internet Protocol (IP) packet.

Additional Examples

The following additional examples pertain to further additional embodiments.

Additional Example 1 is an entity capable of processing the user plane traffic in the default bearer, and sniffing the control plane messages are introduced between the eNB and SGW. It can be extended with the TOF and still termed as TOF.

Additional Example 2 is an entity capable of tracking the location of the UE, the service providing entity residing close to the network edge and host in the Internet in the EPC is introduced. It conducts the location tracking with the report from the TOF. It may notify the location of the specific set of UEs or hosts to the TOF. This entity is called the location database.

Additional Example 3 is a TOF that should identify the user plane traffic in the default bearer by sniffing the control plane message and the response notification of the location database.

Additional Example 4 is a TOF that establishes the GTP tunnel with other TOFs to enable the user plane path bypassing the PGW.

Additional Example 5 is a TOF that should conduct the user plane path selection over the uplink destined to the SGW.

Additional Example 6 is a user plane path selection that is implemented by forwarding the IP packet retrieved from the user plane with different options.

Additional Example 7 is four options for the forwarding of the IP packet retrieved from the user plane. The first option is to locally offload the IP packet to the service providing entity residing close to the network edge. The second option is to locally offload the IP packet to the Internet. The third option is to forward the IP packet to another TOF over the inter-TOF tunnel. The fourth option is to forward the IP packet over the original tunnel for the default bearer.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined by the following claims.

The invention claimed is:

1. A traffic offloading function (TOF) system for selecting efficient user plane paths in a core network supporting wireless cellular communication comprising:
   one or more memory devices including:
      a user plane traffic forwarding table configured to store a set of forwarding entries, the forwarding entries comprising a network prefix entry and an output tunnel endpoint identifier (TEID) entry;
      a location database configured to store location data of a plurality of entities of a network associated with the TOF system;
   a processing unit coupled to the one or more memory devices, the processing unit configured to:
      receive a general packet radio service tunneling protocol (GTP) packet over an uplink (UL) GTP tunnel;
      determine that a network prefix in a forwarding entry of the user plane traffic forwarding table matches a destination Internet Protocol (IP) address of the GTP packet;
      retrieve an output TEID from the forwarding entry that corresponds to the network prefix in the user plane traffic forwarding table; and
      when the output TEID is an offload indicator:
         remove a GTP encapsulation of the GTP packet to form an IP packet; and
         offload the IP packet onto an external network;
      when the output TEID is a valid TEID based on a timer associated with destination path validity:
         replace a TEID of the GTP packet with the output TEID to form a modified GTP packet; and
         forward the modified GTP packet based at least partially on the location data of the location database.

2. The system of claim 1, wherein the external network is the Internet.

3. The system of claim 1, wherein the external network includes an application server.

4. The system of claim 3, wherein to offload the IP packet onto the external network further comprises to:
   determine a TOF node associated with a destination IP address of an edge service provided to the application server; and
   forward the IP packet to the TOF node.

5. The system of claim 1, wherein the plurality of entities of the network include one or more user equipments (UEs).

6. The system of claim 5, wherein to forward the modified GTP packet further comprises to:
   determine a location of a destination UE associated with the modified GTP packet based at least in part on the location data from the location database, the destination UE comprising one of the one or more UEs;
   determine a TOF node associated with the destination UE of the modified GTP packet; and
   forward the IP packet to the TOF node.

7. The system of claim 1, wherein the processing unit is further configured to inspect control plane messages to determine location information of at least one of the plurality of entities of the network and populate the location database with the location information of the at least one entity.

8. The system of claim 7, wherein the control plane messages include Activate Default Bearer Request messages, Initial Context Setup Response messages, UE Context Release Complete messages or Path Switch Acknowledge messages.

9. The system of claim 7, wherein to determine the location information of the UE further comprises to determine an IP address of the UE, evolved universal mobile telecommunications system terrestrial radio access network (E-UTRAN) radio access bearer identifier (E-RAB ID) of a default bearer of the UE, mobility management entity (MME) UE S1 application protocol (S1AP) ID associated with the UE, E-RAB ID list, E-RAB ID, uplink GTP TEID of the default bearer of the UE, or an enhanced node B (eNB) UE S1AP ID.

10. An apparatus of a traffic offloading function (TOF) node supporting wireless cellular communication, comprising:
   a location database interface configured to be coupled to a location database and configured to access location data of user equipments (UEs), the location database configured to store location data of a plurality of entities of a network associated with the TOF node;
   a forwarding table interface configured to be coupled to storage for a user plane traffic forwarding table and configured to access a set of entries of the user plane traffic forwarding table, the entries comprising a network address entry and a tunnel identifier entry;
   a processing unit coupled to the location database interface and the forwarding table interface, the processing unit configured to:
      receive a tunnel packet from a first UE;
      determine that a network prefix in the user plane traffic forwarding table matches a destination network address of the tunnel packet;
      retrieve a tunnel identifier that corresponds to the network prefix in the user plane traffic forwarding table; and
      when the tunnel identifier is an offload indicator:
         determine a first TOF node identifier that services a destination Internet Protocol (IP) address of the tunnel packet;
         when the first TOF node identifier identifies the TOF node:
            extract a network packet from the tunnel packet; and
            offload the network packet onto an external network;
         when the first TOF node identifier identifies an external TOF node:
            forward the tunnel packet to the external TOF node;

when the tunnel identifier is a valid tunnel identifier based on a timer associated with destination path validity:
    replace a first tunnel identifier of the tunnel packet with the tunnel identifier to form a modified tunnel packet; and
when the tunnel identifier is associated with a second UE:
    determine a location of the second UE associated with the tunnel packet based at least in part on the location data from the location database;
    determine a TOF node associated with the second UE; and
    forward the tunnel packet to the TOF node;
when the tunnel identifier is not associated with the second UE, forward the modified tunnel packet.

11. The apparatus of claim 10, wherein the TOF node is configured to service network traffic for one or more enhanced Node Bs (eNBs).

12. The apparatus of claim 10, wherein the tunnel packet is a general packet radio service tunneling protocol (GTP) packet and the tunnel identifier is a tunnel endpoint identifier (TED).

13. The apparatus of claim 10, wherein the destination network address is an Internet Protocol (IP) address and the network packet is an IP packet.

14. The apparatus of claim 10, wherein the processing unit is further configured to:
    determine that the external network is serviced by the TOF node; and
    generate a message to notify the location database of the external network serviced by the TOF node.

15. The apparatus of claim 10, wherein the external network is an Internet host.

16. The apparatus of claim 10, wherein the processing unit is further configured to:
    determine that an edge service entity is serviced by the TOF node; and
    generate a message to notify the location database of the edge service entity serviced by the TOF node.

17. The apparatus of claim 16, wherein the processing unit is further configured to:
    determine a failure of the edge service entity serviced by the TOF node; and
    generate a delete request to the location database to delete records of the edge service entity being serviced by the TOF node.

18. The apparatus of claim 10, wherein the processing unit is further configured to inspect control plane messages to determine location information of a UE and populate the location database with the location information of the UE.

19. The apparatus of claim 10, wherein the processing unit is further configured to establish an inter-TOF tunnel between TOF nodes.

20. The apparatus of claim 10, wherein to establish an inter-TOF tunnel between TOF nodes further comprises to indicate at least one of mobility management entity (MIME) UE S1 application protocol (S1AP) ID, evolved universal mobile telecommunications system terrestrial radio access network (E-UTRAN) radio access bearer identifier (E-RAB ID), enhanced Node B (eNB) UE S1AP ID or a host network prefix.

21. A computer program product comprising a computer-readable storage medium that stores instructions for execution by a processor to perform operations of a traffic forwarding entity of a cellular communications network, the operations, when executed by the processor, to perform a method, the method comprising:
    receive a first packet over a first uplink (UL) tunnel;
    determine that a first network prefix in a first forwarding entry of a traffic forwarding table matches a first destination address of the first packet;
    retrieve a first output tunnel identifier from the first forwarding entry that corresponds to the first network prefix in the traffic forwarding table;
    when the first output tunnel identifier is an offload indicator:
        extract a first network packet from the first packet; and
        offload the first network packet onto an external network; and
    when the first output TEID is a valid TEID based on a timer associated with destination path validity:
        replace a tunnel identifier of the second packet with the second output tunnel identifier to form a modified tunnel packet; and
        forward the modified tunnel packet based at least in part on the second output tunnel identifier and location data of a location database, the location database being configured to store location data of a plurality of entities of a network associated with the traffic forwarding entity.

22. The computer program product of claim 21, wherein the method further comprises:
    receive a second packet over a second uplink (UL) tunnel;
    determine that a second network prefix in a second forwarding entry of a traffic forwarding table matches a second destination address of the second packet;
    retrieve a second output tunnel identifier from the second forwarding entry that corresponds to the second network prefix in the traffic forwarding table;
    determine that the second output tunnel identifier is the offload indicator;
    determine that the second destination address is serviced by another traffic forwarding entity based at least in part on the traffic forwarding table; and
    forward the second packet to the another traffic forwarding entity.

23. The computer program product of claim 21, wherein the method further comprises:
    receive a second packet over a second uplink (UL) tunnel;
    determine that a second network prefix in a second forwarding entry of a traffic forwarding table matches a second destination address of the second packet;
    retrieve a second output tunnel identifier from the second forwarding entry that corresponds to the second network prefix in the traffic forwarding table;
    determine that the second output tunnel identifier is a valid tunnel identifier;
    replace a tunnel identifier of the second packet with the second output tunnel identifier to form a modified tunnel packet; and
    forward the modified tunnel packet based at least in part on the second output tunnel identifier.

24. The computer program product of claim 21, wherein the method further comprises:
    receive a second packet over a second uplink (UL) tunnel;
    determine that a second network prefix in a second forwarding entry of a traffic forwarding table matches a second destination address of the second packet;
    retrieve a second output tunnel identifier from the second forwarding entry that corresponds to the second network prefix in the traffic forwarding table;

determine that the second output tunnel identifier is associated with a UE;

replace a tunnel identifier of the second packet with the second output tunnel identifier to form a modified tunnel packet; and forward the modified tunnel packet to the UE based at least in part on the second output tunnel identifier.

25. The computer program product of claim 24, wherein to forward the modified tunnel packet to the UE further comprises to forward the modified tunnel packet to another traffic forwarding entity using an inter-traffic forwarding entity tunnel for delivery to the UE.

26. The computer program product of claim 25, wherein to forward the modified tunnel packet further comprises to bypass a packet data network (PDN) gateway (PGW).

27. The computer program product of claim 21, wherein the method further comprises:

receive a second packet over a second uplink (UL) tunnel;

determine that a second network prefix is not present within a traffic forwarding table; and forward the second packet to an enhanced packet core.

28. The computer program product of claim 21, wherein the first network packet is an Internet Protocol (IP) packet.

* * * * *